(12) United States Patent
Ricks et al.

(10) Patent No.: US 11,362,912 B2
(45) Date of Patent: Jun. 14, 2022

(54) SUPPORT TICKET PLATFORM FOR IMPROVING NETWORK INFRASTRUCTURES

(71) Applicant: Cywest Communications, Inc., Foothill Ranch, CA (US)

(72) Inventors: Robert R. Ricks, West Jordan, UT (US); Cyrus Nooriala, Herriman, UT (US)

(73) Assignee: Cywest Communications, Inc., Foothill Ranch, CA (US)

( * ) Notice: Subject to any disclaimer, the term of this patent is extended or adjusted under 35 U.S.C. 154(b) by 136 days.

(21) Appl. No.: 16/672,276

(22) Filed: Nov. 1, 2019

(65) Prior Publication Data
US 2021/0135959 A1 May 6, 2021

(51) Int. Cl.
*H04L 41/5074* (2022.01)
*H04L 41/06* (2022.01)
*G06F 16/953* (2019.01)

(52) U.S. Cl.
CPC ........ *H04L 41/5074* (2013.01); *G06F 16/953* (2019.01); *H04L 41/06* (2013.01)

(58) Field of Classification Search
CPC .... H04L 41/5074; H04L 41/06; G06F 16/953
USPC ................................................ 709/223, 224
See application file for complete search history.

(56) References Cited

U.S. PATENT DOCUMENTS

| | | | | |
|---|---|---|---|---|
| 7,225,249 B1* | 5/2007 | Barry | ...................... | H04L 41/18 709/227 |
| 8,903,933 B1* | 12/2014 | Bellini, III | ............ | H04L 51/046 709/206 |
| 2002/0087383 A1* | 7/2002 | Cogger | ................. | H04M 15/83 709/223 |
| 2002/0188643 A1* | 12/2002 | Kennedy | ............. | H04L 41/0893 718/1 |
| 2002/0194319 A1* | 12/2002 | Ritche | ................. | H04L 43/0817 709/223 |
| 2003/0177376 A1* | 9/2003 | Arce Velleggia | ....... | G06F 21/33 713/189 |
| 2006/0107088 A1* | 5/2006 | Katayama | ........... | H04L 43/0817 714/4.1 |
| 2008/0270659 A1* | 10/2008 | Grewal | ............... | G06F 21/6218 710/240 |

(Continued)

*Primary Examiner* — David R Lazaro
*Assistant Examiner* — Mariegeorges A Henry
(74) *Attorney, Agent, or Firm* — Kirton McConkie; Brian Tucker

(57) ABSTRACT

A support ticket platform improves the provision and maintenance of network infrastructures. A support ticket platform can include a support ticket server and a support ticket database that employ a unique architecture and configuration to provide such improvements in a scalable manner. The support ticket platform can be configured to automatically detect network issues and to leverage its unique architecture and configuration to automatically create support tickets to represent the network issues. The support ticket platform can employ network and company objects to rapidly create a large number of support tickets and to enable management of the support tickets as a group. The support ticket platform can also leverage its unique architecture and configuration to provide a number of additional functions for improving the provision and maintenance of network infrastructures.

17 Claims, 21 Drawing Sheets

(56) References Cited

U.S. PATENT DOCUMENTS

2010/0031273 A1* 2/2010 Stephan ................ H04L 41/044
                                                        719/318
2016/0373944 A1* 12/2016 Jain ....................... H04W 24/02
2018/0005243 A1*  1/2018 Zovi ................... G06Q 20/4016
2019/0356535 A1* 11/2019 Li ........................ H04L 41/0681

* cited by examiner

| Managed Device Table 112a |
|---|
| Device ID |
| Name |
| Type |
| Script Type |
| Service ID |
| Internal IP |
| External IP |
| Management IP |
| Site ID |
| ... |

| Site Table 112b |
|---|
| Site ID |
| Company ID |
| Site Name |
| Latitude |
| Longitude |
| Is_hold |
| ... |

| Company Table 112c |
|---|
| Company ID |
| Name |
| Is_hold |
| ... |

| User Table 112d |
|---|
| User ID |
| Company ID |
| ... |

| Network Object Table 112e |
|---|
| Network Object ID |
| Object Name |
| ... |

| Network Object Devices Table 112f |
|---|
| ID |
| Network Object ID |
| Company ID |
| Site ID |
| Device ID |
| ... |

| Company Object Table 112g |
|---|
| Company Object ID |
| Object Name |
| Category ID |
| Company ID |
| Primary ID |
| Secondary ID |
| Tertiary ID |
| ... |

| Company Object Devices Table 112h |
|---|
| ID |
| Company Object ID |
| Site ID |
| Device ID |
| ... |

*FIG. 3A*

| Application Log Table 112i | System Log Table 112j | Policy Table 112k | Script Table 112l |
|---|---|---|---|
| Log ID<br>Log Type<br>Code<br>Title<br>Log<br>Ticket ID<br>IP Address<br>... | Log ID<br>Log Type<br>Title<br>Log<br>Logger<br>IP Address<br>... | Policy ID<br>Device ID<br>Date<br>Flag<br>... | Script ID<br>Script Type<br>Script Name<br>Script Description<br>Inv Type<br>Script Command<br>User Level<br>... |

| Script Device Table 112m | Device Command Table 112n | Support Ticket Table 112o | Master Ticket Table 112p |
|---|---|---|---|
| ID<br>Device ID<br>Script ID<br>... | ID<br>Device ID<br>Command ID<br>... | Ticket ID<br>Device ID<br>Site ID<br>Company ID<br>Master Ticket ID<br>Subject<br>Help Topic<br>Network Issue<br>... | Master Ticket ID<br>Network Object ID<br>Subject<br>Help Topic<br>Network Issue<br>... |

*FIG. 3B*

Support Personnel Device 500

Dashboard

Create Network Object

Network Object Name: Network Object 1

Companies: Company 1 ×

Managed Devices:
Device 1 × | Device 2 × | Device 3 ×
Device 4 × | Device 5 × | Device 6 ×
Device 7 × | Device 8 × | Device 9 ×
Device 10 × | Device 11 × | Device 12 ×
Device 13 × | Device 14 × | Device 15 ×
...

Create

① Support personnel provides input to define the network object to be created

*FIG. 5A*

Support Personnel Device 500

Dashboard

Create Network Ticket

Network Object: [Select Network Object ▼]

Subject: [ ]

Help Topic: [Select Help Topic ▼]

Network Issue Summary: [ ]

Primary Contact: [Select Contact ▼]

[Create]

(1) Support personnel provides input to define a network ticket to be created

*FIG. 6A*

①  Support personnel provides input to define a script to be created

Support Personnel Device 500

Dashboard

Create Script

Script Type: Select Script Type ▼

Script Name:

Script Description:

Script Command:

User Level: ○ Admin  ○ Techs

Create

*FIG. 7A*

SUPPORT TICKET PLATFORM FOR IMPROVING NETWORK INFRASTRUCTURES

CROSS-REFERENCE TO RELATED APPLICATIONS

N/A

BACKGROUND

A support ticket system is a customer service tool for managing service and support requests. When a customer submits a request for support or a support event otherwise occurs, support personnel can create a "support ticket" to represent the request and to store and share information about the request as it is being resolved.

Support ticket systems are used in many different environments. For example, in a network infrastructure environment, a support ticket system can be used to track network outages, node or service failures, communication issues or any other network event that may need attention. To ensure that it can quickly address any network issues, a network infrastructure provider typically relies heavily on a support ticket system.

Given the complexity of network infrastructures, the number of possible support issues that may arise, the number of customers, and many other factors, it can be difficult to timely address network issues even when a support ticket system is employed. For example, with some issues that occur in a network infrastructure environment, it may take more time to create a support ticket than to resolve the issue that the support ticket represents. The difficulty of creating support tickets may even act as a barrier to providing certain support services.

Such difficulties do not end once a support ticket is created. For example, as support personnel work to address a network issue, existing support ticket systems typically require the support personnel to manually input information about the network issue including any corrective actions they may have taken. Similarly, once a network issue is resolved, the support personnel will have to manually close the support ticket. In short, existing support ticket systems lack intelligence that would enable such processes to be automated and/or streamlined.

BRIEF SUMMARY

The present invention extends to methods, systems and computer program products for implementing a support ticket platform to improve network infrastructures. A support ticket platform can include a support ticket server and a support ticket database that employ a unique architecture and configuration that improves the provision and maintenance of network infrastructures in a scalable manner. The support ticket platform can be configured to automatically detect network issues and to leverage its unique architecture and configuration to automatically create support tickets to represent the network issues. The support ticket platform can employ network and company objects to rapidly create a large number of support tickets and to enable management of the support tickets as a group. The support ticket platform can also leverage its unique architecture and configuration to provide a number of additional functions for improving the provision and maintenance of network infrastructures.

In some embodiments, the present invention can be implemented as computer storage media storing computer executable instructions which when executed implement a support ticket platform for managing a plurality of network infrastructures. The support ticket platform includes a support ticket database and a support ticket server that is in communication with the support ticket database. The support ticket server is also configured to receive alerts from the plurality of network infrastructures. In response to receiving an alert that defines a network issue, the support ticket server can automatically create a support ticket to represent the network issue by: parsing the alert to obtain a service ID that is included in the alert; employing the service ID to query the support ticket database to retrieve information about a particular managed device; and employing the retrieved information about the particular managed device to submit one or more requests to the support ticket database to create a support ticket that associates the network issue with the particular managed device.

In some embodiments, the present invention can be implemented in a support ticket platform that includes a support ticket server and a support ticket database as a method for managing a plurality of network infrastructures. The support ticket server receives a request to create support tickets using a network object or a company object. The support ticket server can then employ an identifier of the network object or the company object to submit one or more requests to the support ticket database to create a master ticket representing a network issue. The support ticket server can also employ the identifier of the network object or the company object to query the support ticket database to retrieve identifiers of a plurality of managed devices that are associated with the network object or the company object. For each of the plurality of managed devices, the support ticket server can employ the identifier of the managed device to create a support ticket that is associated with the master ticket and which also represents the network issue that the master ticket represents.

In some embodiments, the present invention can be implemented in a support ticket platform that includes a support ticket server and a support ticket database as a method for managing a plurality of network infrastructures. The support ticket server can employ the support ticket database to associate managed devices with service IDs. Then, in response to receiving alerts that include service IDs, the support ticket server employs the service IDs to retrieve information about the associated managed devices from the support ticket database and employs the retrieved information to automatically create support tickets. The support ticket server can also employ the support ticket database to associate network or company objects with managed devices. Then, in response to receiving requests to create support tickets using network or company objects, the support ticket server employs the network or company objects to create one or more master tickets and support tickets for the associated managed devices and arranges the support tickets hierarchically below the one or more master tickets.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIGS. 3, 3A and 3B illustrate a non-limiting example of how a support ticket database can be configured to enable techniques of the present invention to be implemented;

FIGS. 5A-5D illustrate an example of how the support ticket platform can create a network object;

FIGS. 6A-6E illustrate an example of how the support ticket platform can employ a network object to create a large number of support tickets;

FIGS. 7A, 7B and 8 illustrate an example of how the support ticket platform can implement scripting.

DETAILED DESCRIPTION

In this specification and the claims, the term "network issue" should be construed as any situation that may occur or exist within a network infrastructure that may be represented by a support ticket. A network issue should therefore encompass the state, status or condition of any component in the network infrastructure, any type of failure of a component, any type of communication error or failure, the existence of an update, a component's failure to respond to a polling request, etc. The term "alert" should be construed as a communication that is sent by a component of a network infrastructure and that defines a network issue. The term "managed device" should be construed as a component of a network infrastructure with which the support ticket platform communicates for management purposes.

Figure 1:
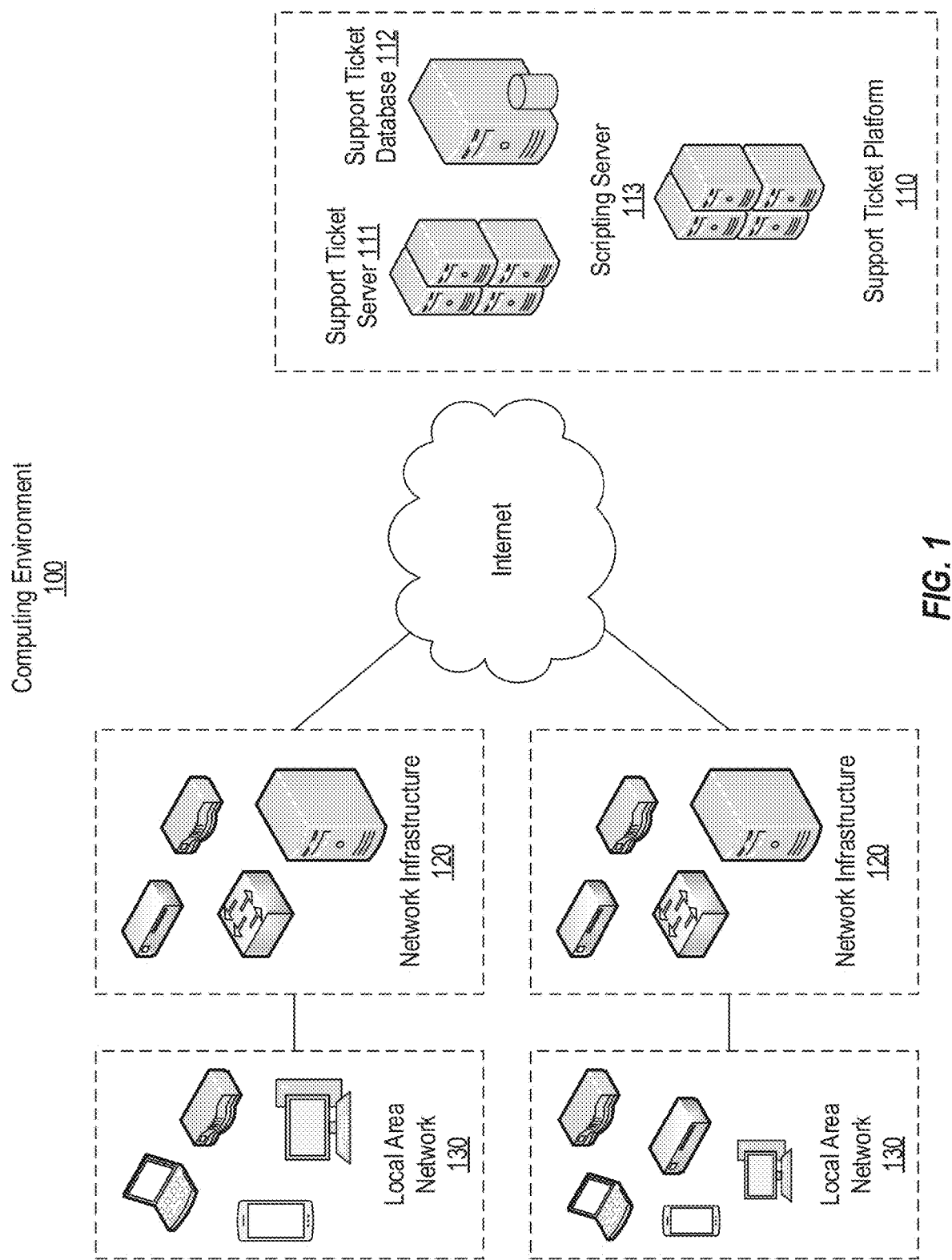
FIG. 1 illustrates an example computing environment in which the present invention can be implemented.

FIG. 1 illustrates an example computing environment 100 in which the present invention may be implemented. Computing environment 100 includes a support ticket platform 110, one or more (and likely many) network infrastructures 120 and local area networks 130. Support ticket platform 110 may include a support ticket server (or servers) 111 and a support ticket database 112. Support ticket server 111 could represent one or more physical and/or virtual machines on which components that perform the functionality described herein are executed. Support ticket database 112 could also represent one or more physical and/or virtual machines on which a database is implemented. Accordingly, support ticket platform 110 could be implemented in any suitable computing architecture including, for example, on-premise architectures and cloud architectures.

Each network infrastructure 120 can represent the computing components that are used to create a network by which an entity or individual accesses services and/or content over the internet. In a common example, a business may employ network infrastructure 120 to connect its local area network 130 to the internet (or another WAN). In some cases, network infrastructure 120 may even encompass components of the local area network 130 and/or may include network storage devices. Accordingly, network infrastructure 120 may oftentimes include routers, switches, servers, storage devices, etc.

In many cases, network infrastructure 120 may implement a virtual network in which case the hardware components may include virtualizing software for creating virtual switches, virtual machines, virtual network adapters, etc. It is noted, however, that the particular components and/or configuration of a network infrastructure 120 are not essential to the present invention. Of importance is the fact that network infrastructure 120 includes a number of physical and/or virtual components that provide one or more communication pathways between local area network 130 and the internet. Of these components, at least one is a managed device with which support ticket server 111 communicates for purposes of managing network infrastructure 120. A primary goal of the present invention is to improve the provision and maintenance of many different types and configurations of network infrastructures 120 so that devices in local area network 130 can access internet-based services quickly and reliably.

Figure 2:
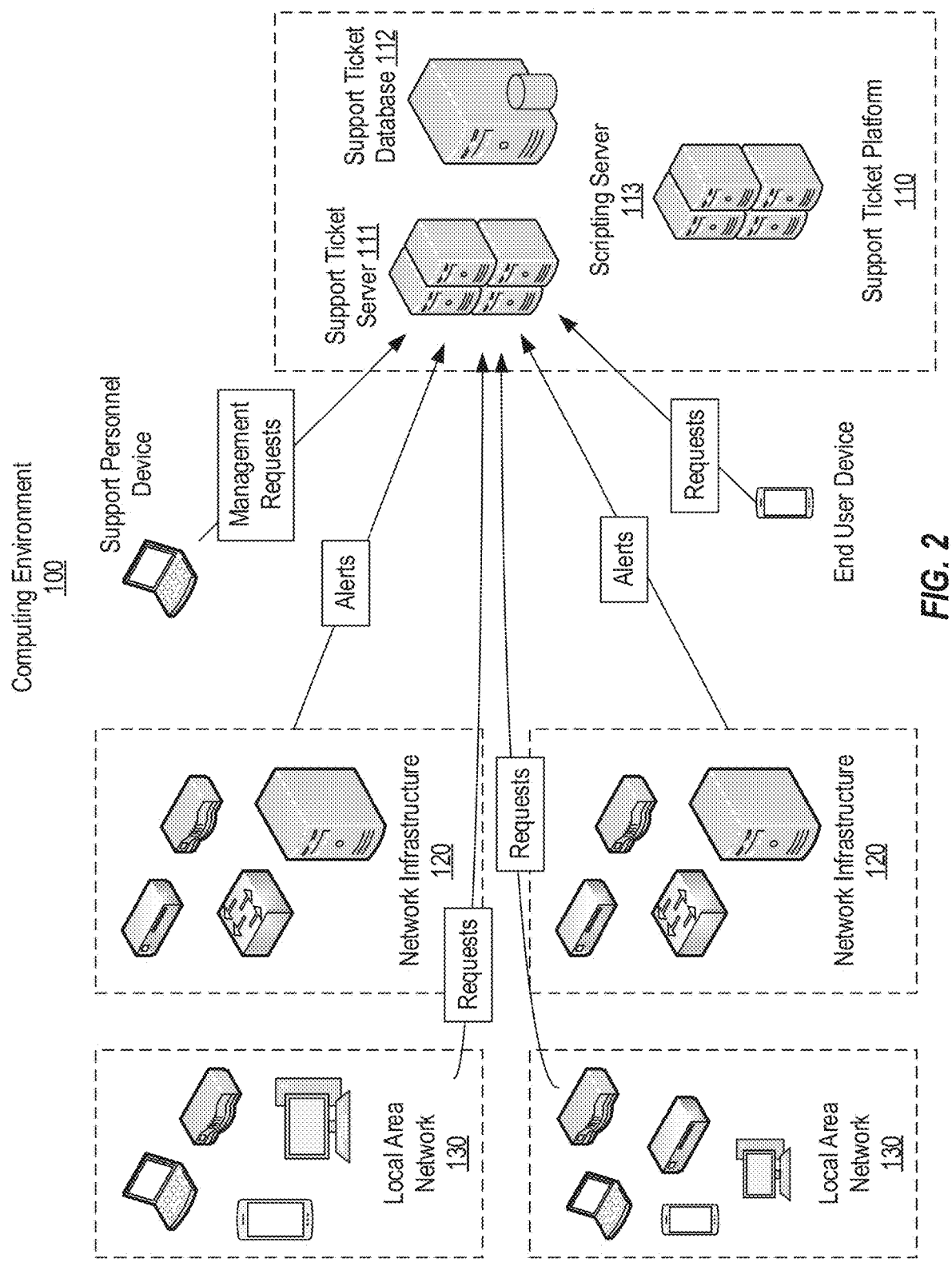
FIG. 2 illustrates how various devices and components of a network infrastructure can communicate with the support ticket platform in some embodiments of the present invention.

FIG. 2 generally illustrates how various components in computing environment 100 can communicate with support ticket server 111. At least some components in a network infrastructure 120 can be configured to send alerts to support ticket server 111 when a network issue occurs or is otherwise detected. For example, network architecture 120 could include routers, switches, virtual machines, etc. that are configured to monitor themselves and possibly interconnected components to determine when network issues exist and then send alerts to report detected network issues. Similarly, network architecture 120 could include software-based monitors (e.g., that are executed on servers in network architecture 120) that are configured to poll (or otherwise receive communications from) other components of network architecture 120 to detect network issues and to send alerts when such polling reveals that network issues exist. These components that send alerts may be, but need not be, managed devices within network architecture 120.

Many different protocols could be used to detect and/or relay information defining a network issue. In short, any suitable technique could be employed to detect network issues and send alerts to support ticket server 111 to report the network issues. In some embodiments, an alert can be in the form of an email. In such cases, support ticket server 111 could function as an email server while the components of network infrastructure 120 that send alerts could function as email clients.

FIG. 2 also shows that support ticket server 111 can receive requests from end user devices that may or may not be part of local area network 130. For example, a user could employ his or her computer at work to submit a request to support ticket server 111 via local area network 130 and network infrastructure 120. In contrast, a user could employ his or her device (e.g., a smart phone or laptop) to submit a request to support ticket server 111 over some other connection. These requests could also be in the form of emails that report perceived network issues. Accordingly, for purposes of this description, an alert can be distinguished from a request in that an alert is sent by a component of network infrastructure 120 while a request is manually sent by an end user. FIG. 2 further shows that support personnel may also access support ticket server 111 for management/support purposes.

Figure 3:
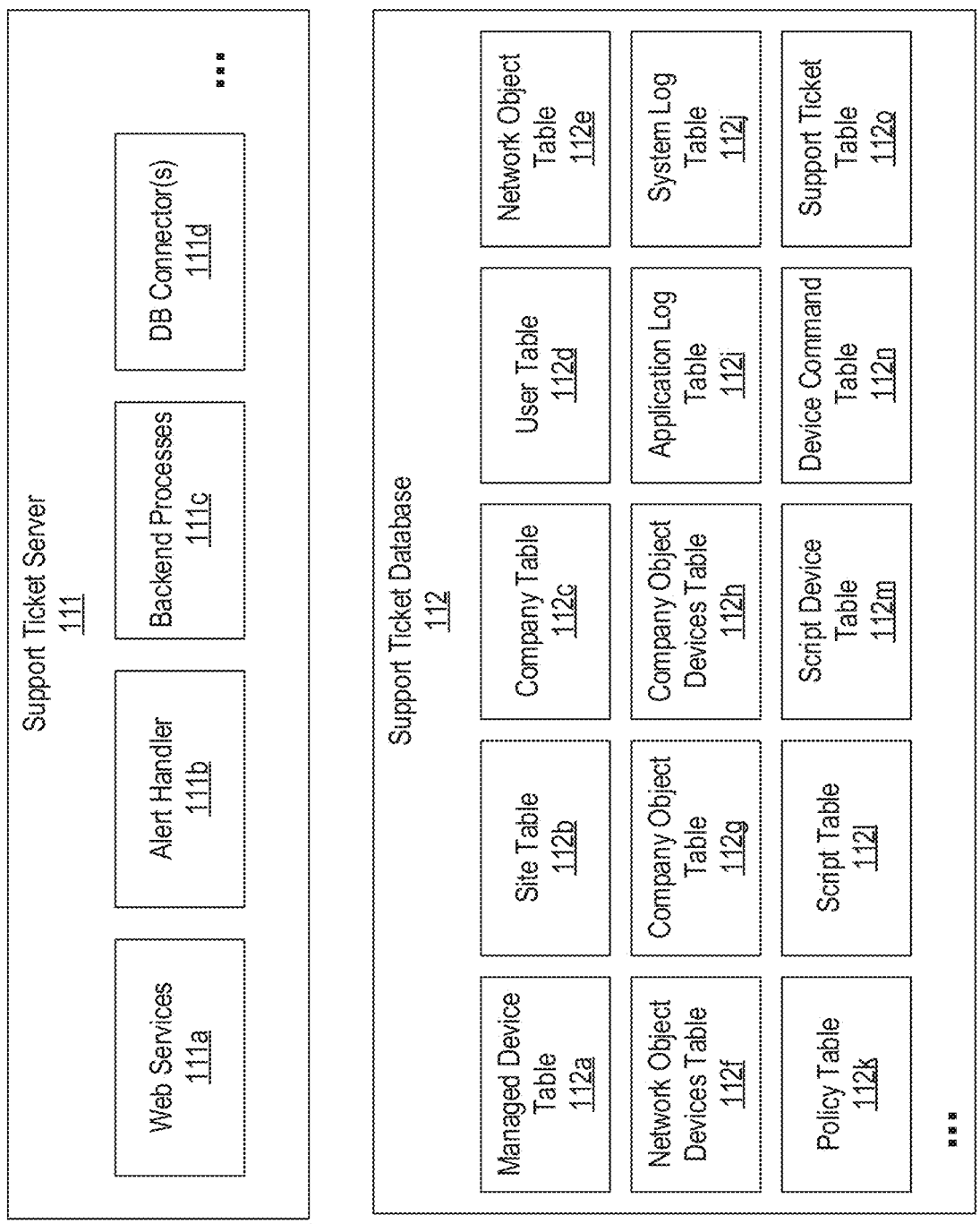

FIG. 3 provides an example of how support ticket server 111 and support ticket database 112 may be configured to enable the techniques of the present invention to be implemented. As shown, support ticket server 111 may include web services 111*a*, an alert handler 111*b*, backend processes 111*c* and DB connector(s) 111*d* among possibly other components. Web services 111*a* can represent the functionality for providing browser-based and/or mobile-application-based user interfaces to support personnel and/or end users. Web services 111*a* can encompass application programming interfaces (APIs) by which support personnel and/or end users can provide information, instructions or other content to support ticket server 111.

Alert handler 111*b* represents the component(s) of support ticket server 111 that receive alerts from components of the various network infrastructures 120. For example, when the alerts are in the form of emails, alert handler 111*b* could represent components of an email server. Alternatively or additionally, alert handler 111*b* could be a service that listens for web-based communications.

Backend processes 111*c* represent the components that perform the primary processing on support ticket server 111. For example, backend processes 111*c* can be interfaced with web services 111*a* to receive data provided by support personnel and/or end users, perform processing on the data to carry out the proper functionality and then provide any appropriate results back to web services 111*a*. Similarly, backend processes 111*c* can be interfaced with alert handler 111*b* to access and process alerts.

DB connector(s) 111*d* represent the components of support ticket server 111 that interface with support ticket database 112. For example, backend processes 111*c* could employ DB connector(s) 111*d* to submit queries to support ticket database 112. The depicted components of support ticket server 111 are intended to illustrate the different types of functionality that support ticket server 111 provides but should not be viewed as limiting the present invention to any particular configuration of support ticket server 111.

Support ticket database 112 may include a number of data structures having a logical arrangement that facilitates the provision of the functionality described herein. In other words, the structure of support ticket database 112 improves the provision of network infrastructures 120. As will become apparent below, these improvements include enabling a network infrastructure 120 to self-heal, enabling managed devices to be grouped together when addressing a network issue and enabling the automatic creation of support tickets from alerts, among many other improvements.

As shown in FIG. 3, support ticket database 112 may include a number of different tables. In this context, the term "table" should be construed generally as encompassing any of the various forms of data structures that databases may employ to store related data sets (or records). As an overview, managed device table 112*a* can be used to define the managed devices that exist in the various network infrastructures 120. Site table 112*b* can be used to define the sites where network infrastructures 120 are implemented. Company table 112*c* and user table 112*d* can be used to define companies and end users respectively.

Network object table 112*e* can be used to define network objects, while network object devices table 112*f* can be used to define managed devices that belong to a network object. Similarly, company object table 112*g* can be used to define company objects, while company object devices table 112*h* can be used to define managed devices that belong to a company object.

Application log table 112*i* and system log table 112*j* can be used to define log entries. Policy table 112*k* can be used to define managed devices for which a policy violation applies. Script table 112*i* can be used to define scripts that are available within support ticket platform 110. Script device table 112*m* can be used to define scripts that have been assigned to managed devices. Device command table 112*n* can be used to define commands that are utilized within scripts that are assigned to a managed device. Finally, support ticket table 112*o* can be used to define support tickets, while master ticket table 112*p* can be used to define master support tickets.

FIGS. 3A and 3B provide examples of how each of tables 112*a*-112*p* could be structured. These specific examples represent only one way in which support ticket database 112 could be structured and therefore should not be viewed as limiting the invention. Of importance are the logical relationships that these data structures define and how these relationships are leveraged to improve the provision of network infrastructures 120. The following description illustrates how the structure of support ticket database 112 enables support ticket server 111 to perform a number of functions to improve the provision of network infrastructures 120.

Figure 4A:
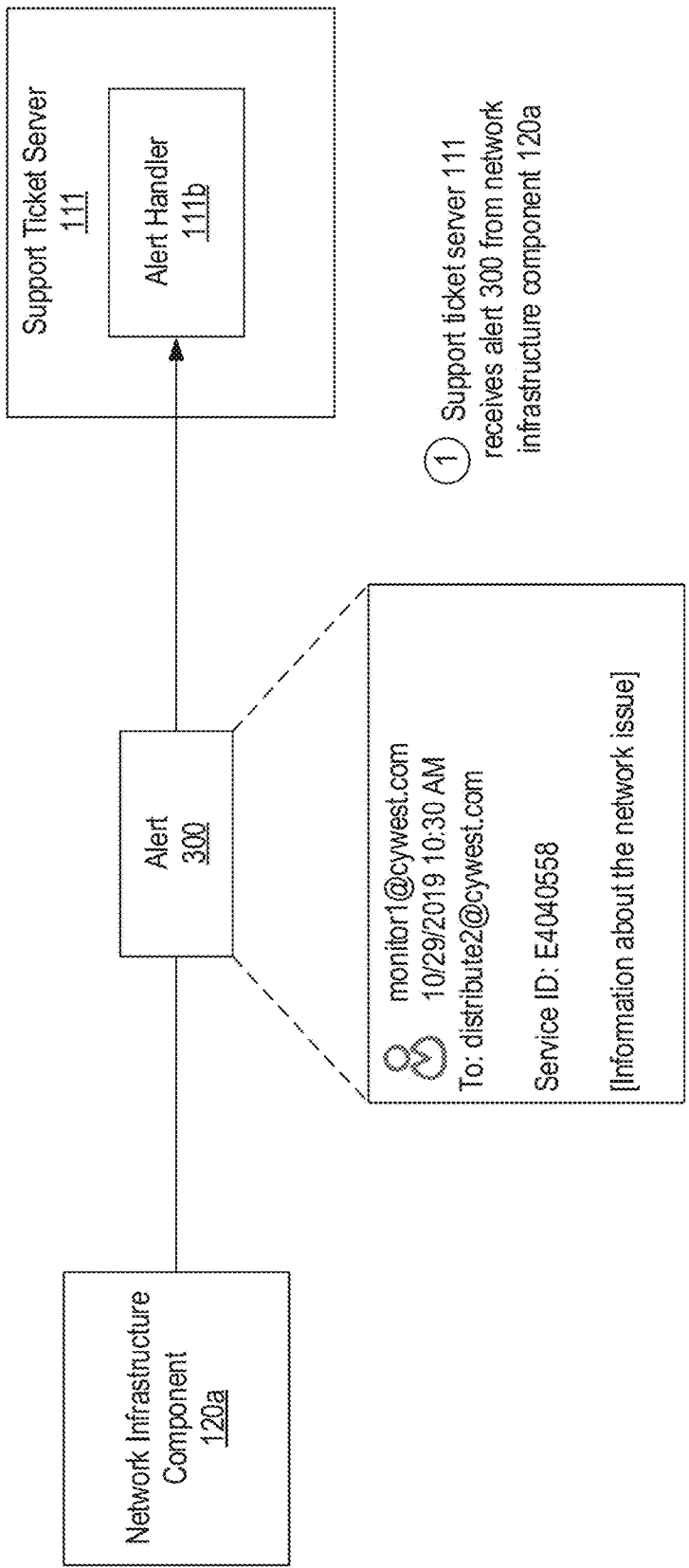
FIGS. 4A-4C illustrate an example of how the support ticket platform can automatically create a support ticket using only a service ID defined in an alert.
Figure 4B:
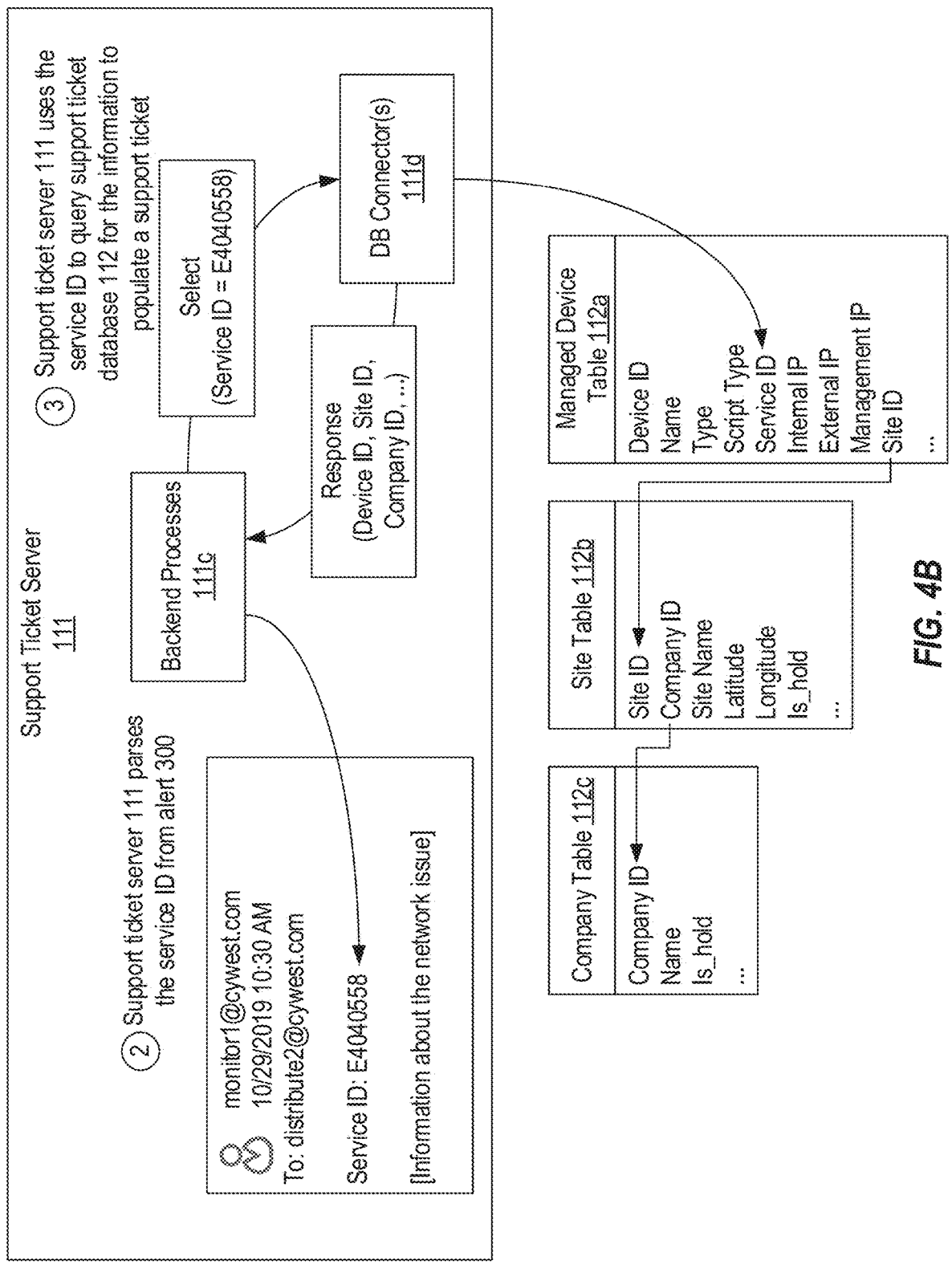
Figure 4C:
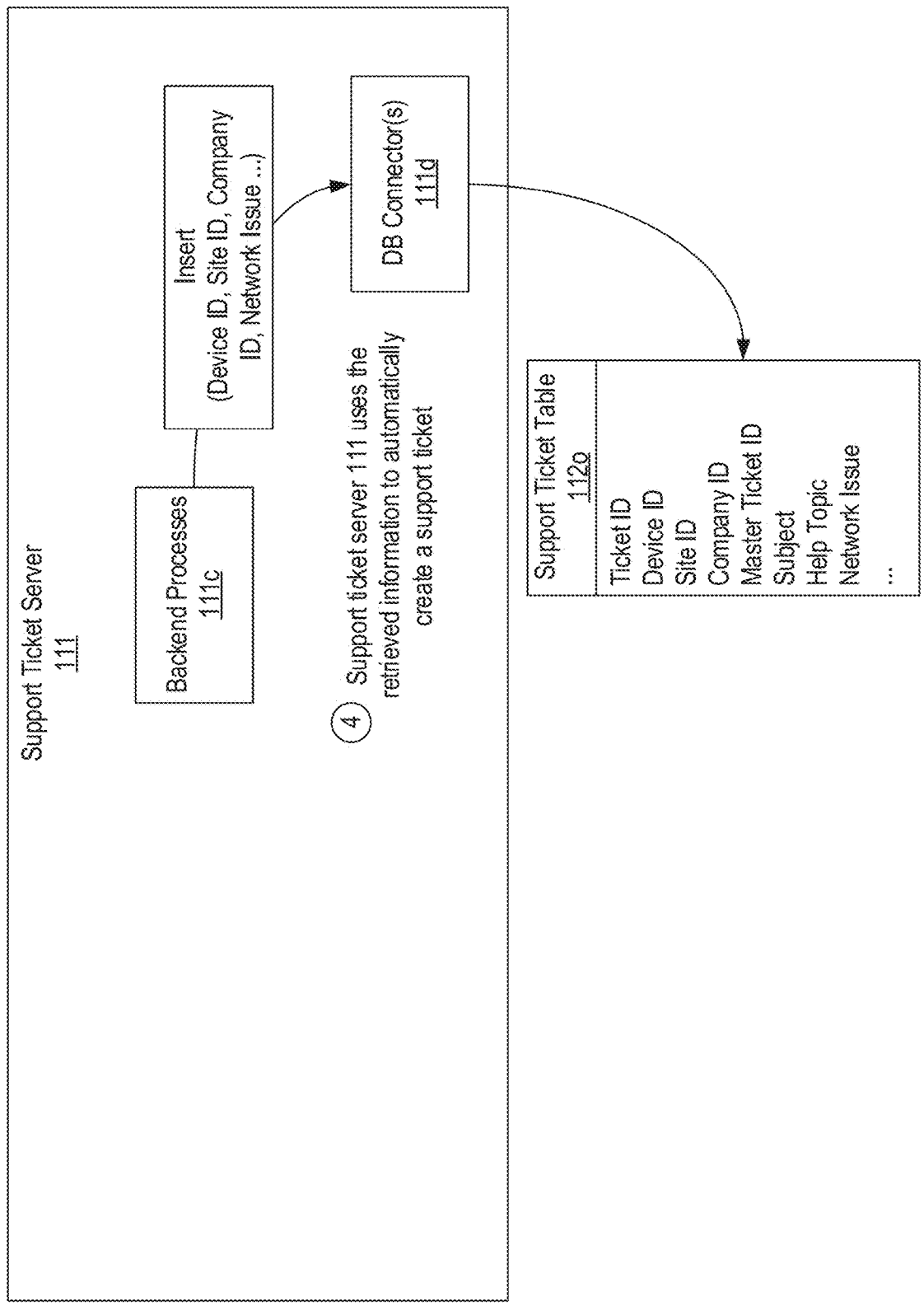

FIGS. 4A-4C illustrate how support ticket platform 110 simplifies the process of sending alerts and creating support tickets therefrom. In step 1 shown in FIG. 4A, it is assumed that a network infrastructure component 120*a* has detected a network issue and, in response, has sent an alert 300 to alert handler 111*b* of support ticket server 111. As shown, alert 300 is assumed to be in the form of an email and identifies a service ID and provides information about the network issue. A service ID can be a unique identifier within support ticket platform 110. In the context of an alert, the service ID can uniquely identify a particular managed device that is the cause of the network issue.

Turning to FIG. 4B, once alert handler 111*b* receives alert 300, it can notify backend processes 111*c* (or backend processes 111*c* can otherwise detect alert 300). Then, in step 2, backend processes 111*c* can parse the service ID from alert 300. In step 3, backend processes 11*c* can employ DB connector(s) 11*d* to submit a query to support ticket database 112 to retrieve information using the service ID. For example, the query could employ the service ID to locate a corresponding managed device record in managed device table 112*a*, employ a site ID defined in the corresponding managed device record to locate a corresponding site record in site table 112*b* and employ a corresponding company ID defined in the corresponding site record to locate a corresponding company record in company table 112*c*. The query can be structured to retrieve a device ID of the managed device to which alert 300 pertains (e.g., the device ID to which the service ID maps), a site ID of the site where the managed device is located (e.g., the site ID to which the service ID maps) and a company ID of the company associated with the site (e.g., the company ID to which the service ID maps) among possibly many other values as needed to populate the fields of a support ticket record in support ticket table 112*o*.

Finally, in step 4 shown in FIG. 4C, backend processes 111*c* can employ the information retrieved using the service ID it parsed from alert 300 to submit a request to create a support ticket record in support ticket table 112*o*. Accordingly, support ticket platform 110 enables a support ticket to be automatically created from a service ID. As a result, a simplified configuration of network infrastructure components that send alerts can be employed. Likewise, support tickets can be created much more quickly and accurately resulting in quicker and even automated resolution of the network issues that the support tickets represent. Furthermore, by including only the service ID in the alert, the alert will not include any sensitive information that could be exploited if the alert were intercepted. The unique configuration of support ticket server 111 and the underlying support ticket database 112 enable these improvements to the provision of network infrastructures 120.

FIGS. 5A-5D illustrate how support ticket platform 110 enables network objects to be created, while FIGS. 6A-6E illustrate how support ticket platform 110 enables network objects to be used to create and manage a number of support tickets in a hierarchical manner. As an overview, a network object can represent a grouping of managed devices. A grouping may typically be based on the architecture of a network infrastructure 120. For example, a network object may be defined for all managed devices that are connected downstream from a particular switch or all managed devices that rely on a particular server for some functionality.

Figure 5B:
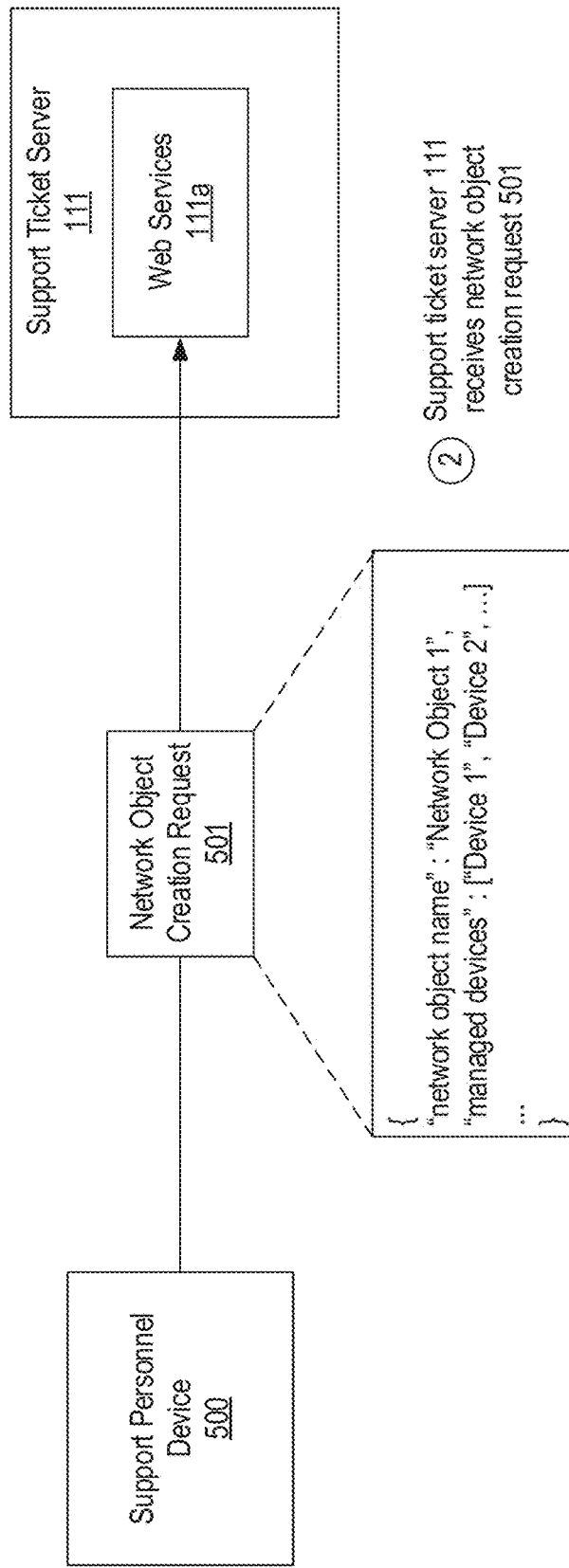

FIG. 5A illustrates an example dashboard that can be displayed on a support personnel device 500. The dashboard provides an option to create a network object by inputting a network object name, selecting one or more companies whose devices may be included under the network object and selecting each managed device that should be included under the network object. To simplify the example, it is assumed in step 1 that a single company has been selected along with many of the company's managed devices that should be included under a network object named Network Object 1. In step 2, shown in FIG. 5B, it is assumed that the support personnel have selected the create button provided in the dashboard thereby causing a network object creation request 501 to be sent to web services 111a. For simplicity, network object creation request 501 is shown as defining the network object name and an array of device IDs for the selected managed devices.

Figure 5C:
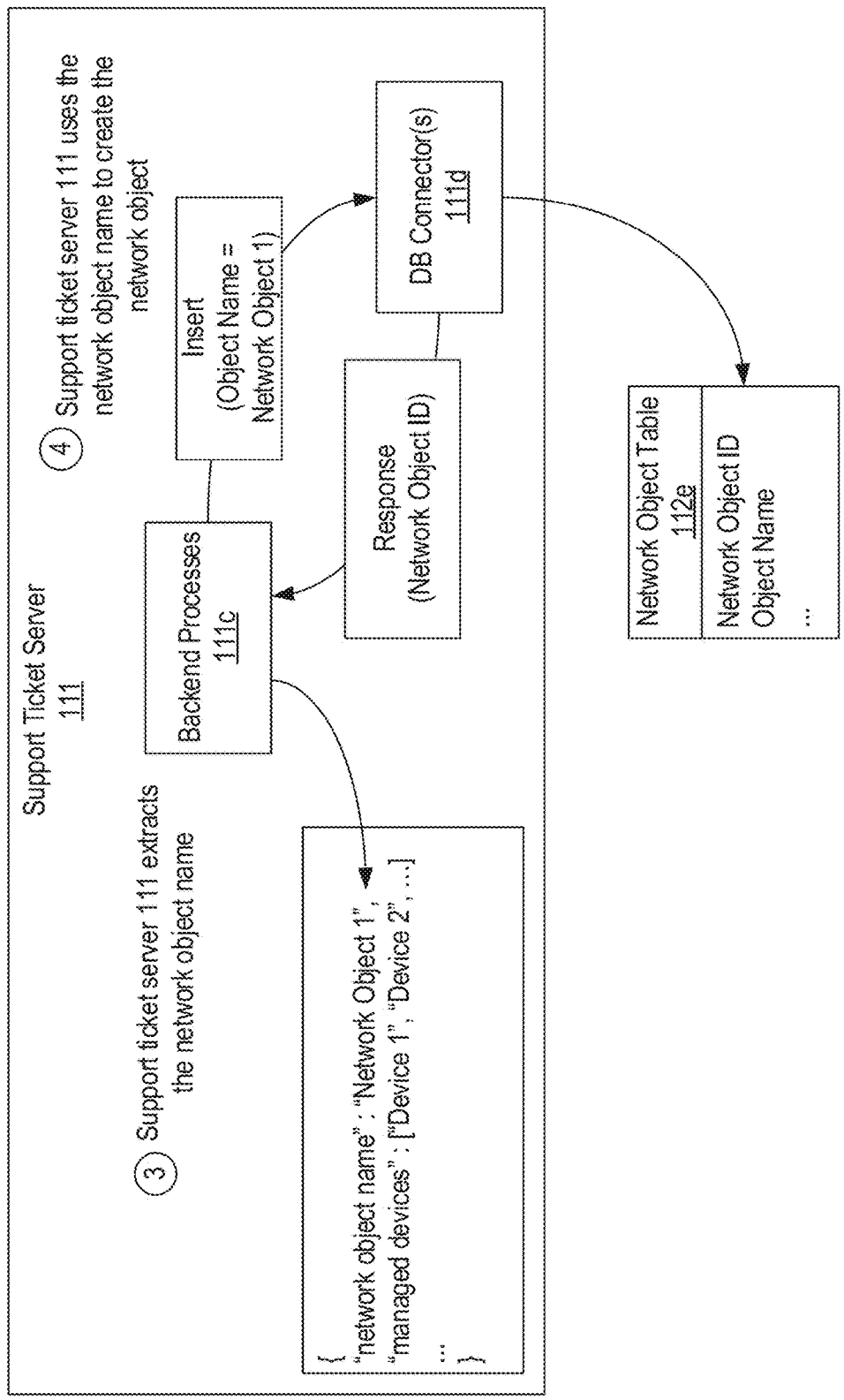

Turning to FIG. 5C, in response to the receipt of network object creation request 501, in step 3, backend processes 111c can extract the network object name and use it in step 4 to create a record in network object table 112e. The created record will be assigned a network object ID that backend processes 111c can receive for subsequent use.

Figure 5D:
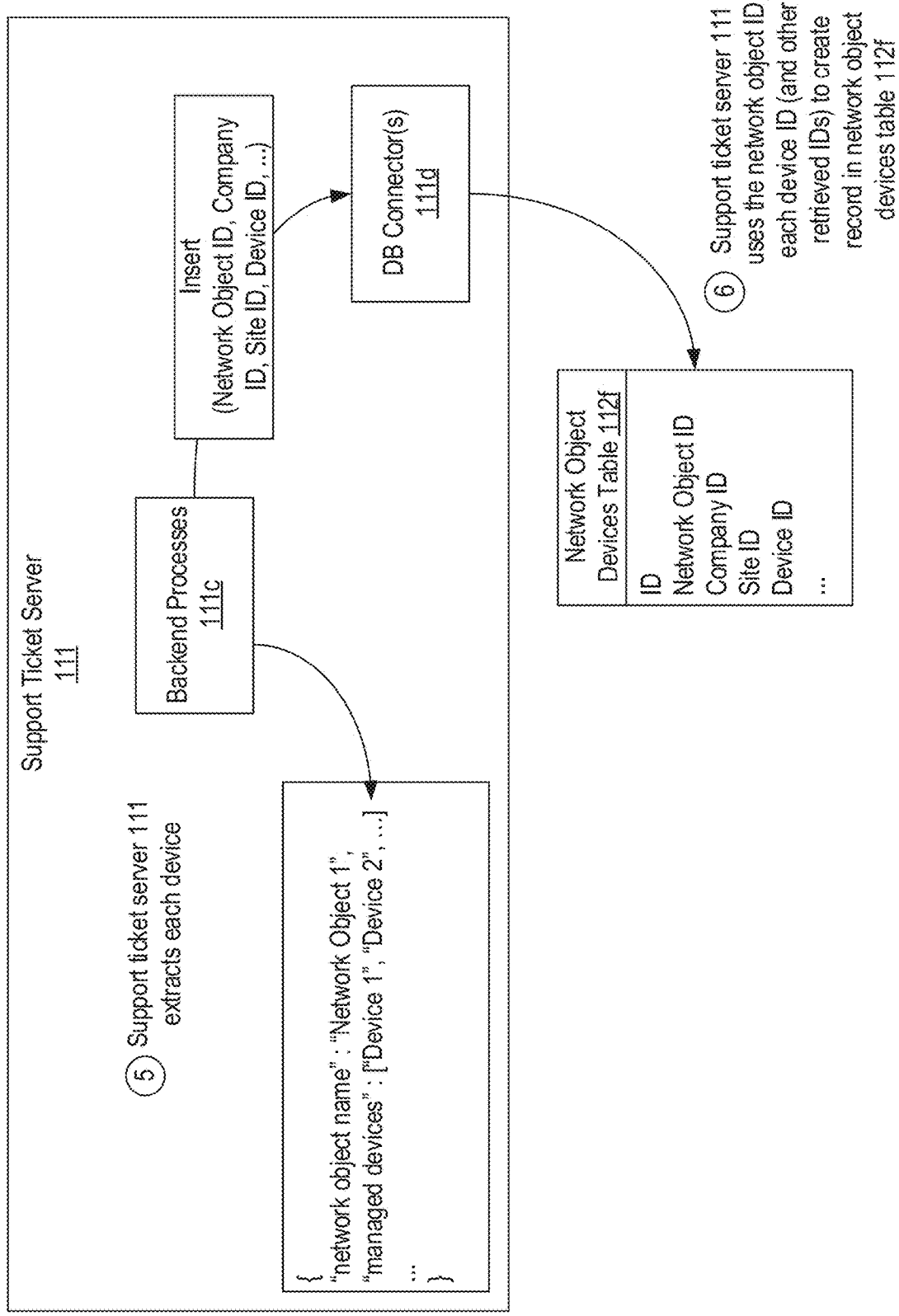

Next, in step 5 shown in FIG. 5D, backend processes 111c can extract each device ID from network object creation request 501 and in step 6 use each device ID along with the network object ID to create records in network object-devices table 112f. As shown, backend processes 111c could employ each device ID to retrieve additional information such as the company ID and site ID associated with the device ID.

The result of the process depicted in FIGS. 5A-5D is the creation of network object that identifies a number of managed devices that are included under the network object. In other words, the creation of a network object creates a parent-child relationship between the network object and the managed devices. This hierarchical arrangement can be leveraged to facilitate the creation and management of support tickets as described below.

Figure 6B:
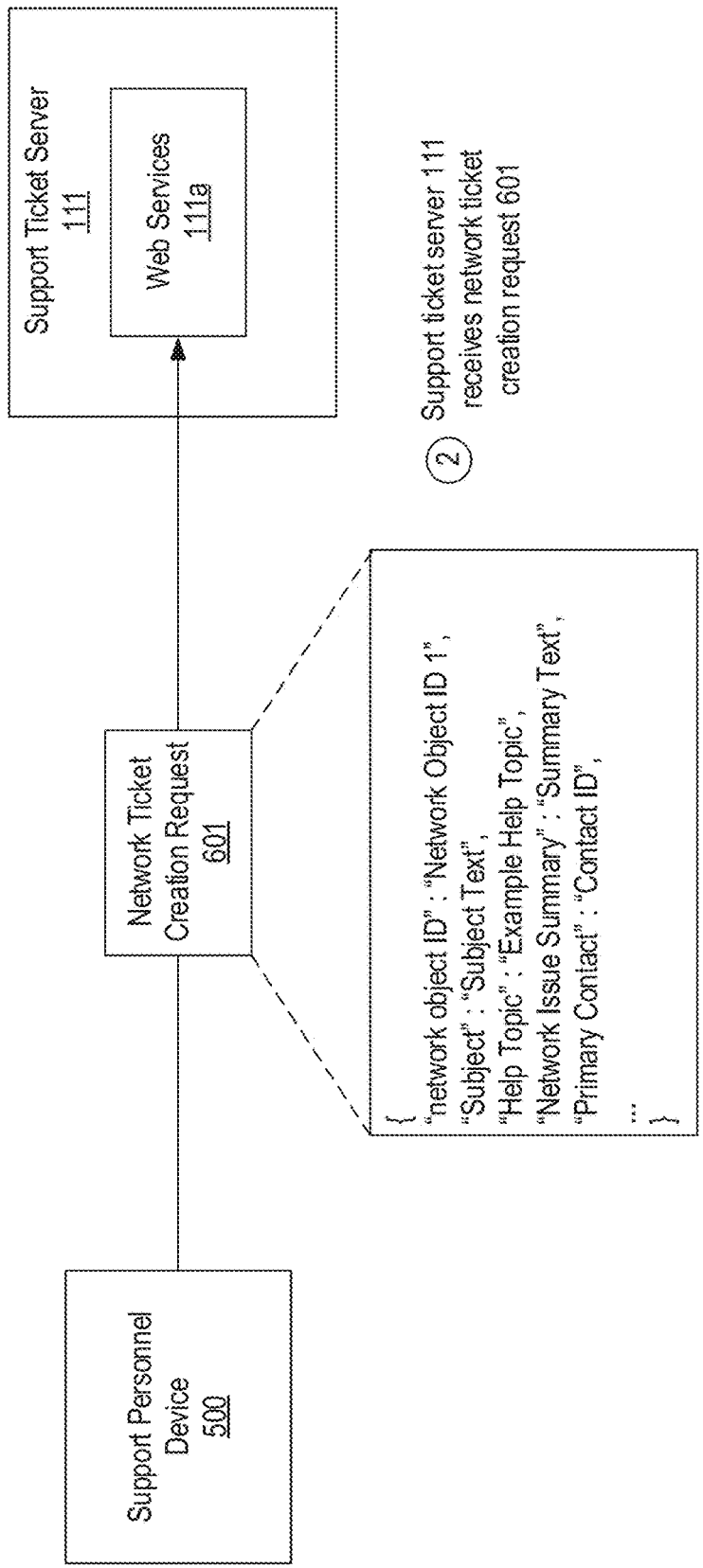

FIGS. 6A-6E provide an example of how support personnel can employ a network object to quickly create and easily manage a large number of support tickets. FIG. 6A illustrates how the dashboard can provide an option to create a network ticket—i.e., to create support tickets from a network object. In step 1, it is assumed that support personnel provide the required input into the dashboard including selecting the network object having a network object ID of Network Object ID 1. Then, in step 2, a network ticket creation request 601 can be sent to web services 111a to submit the input.

Figure 6C:
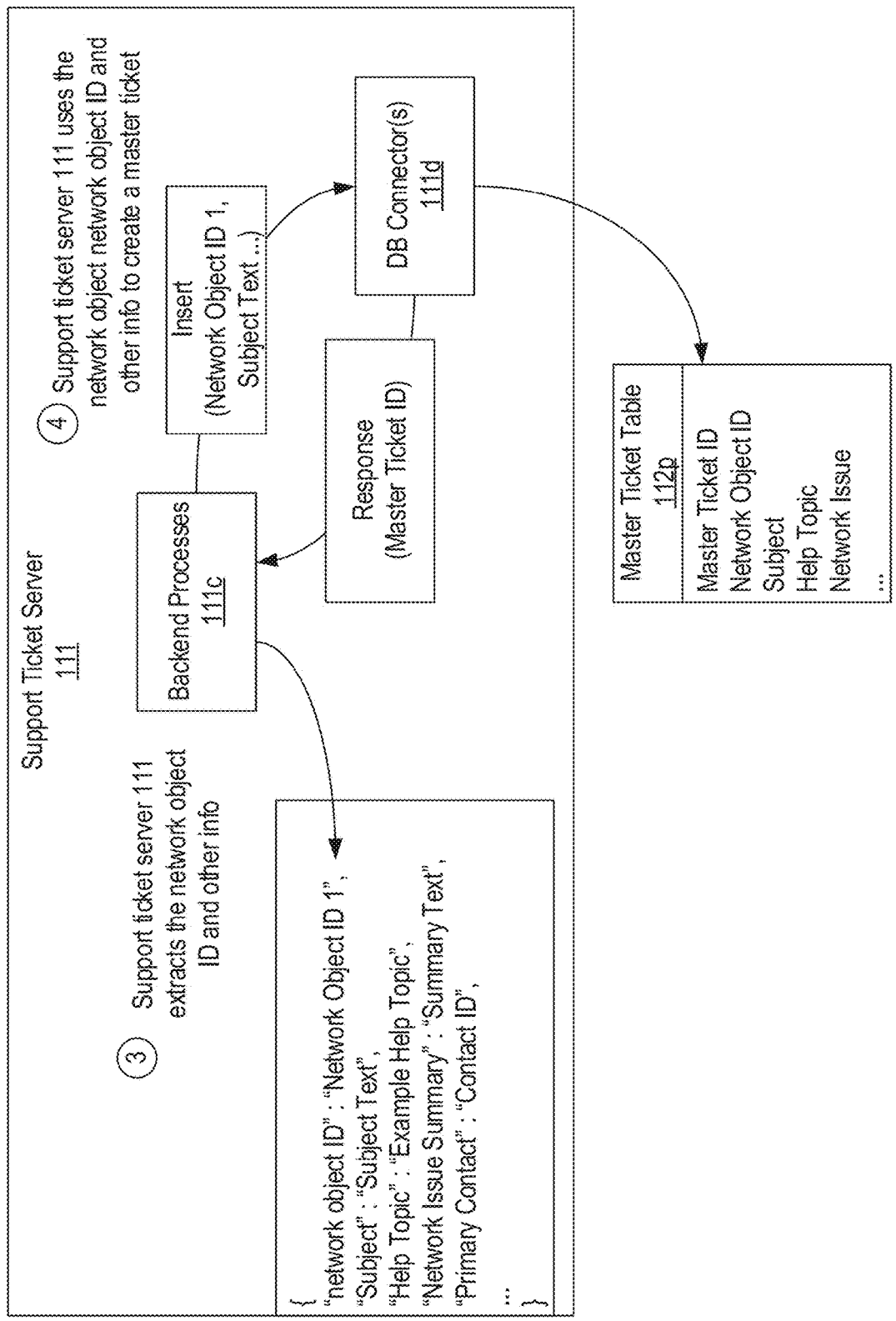

In step 3 shown in FIG. 6C, backend processes 111c can extract the network object ID and other information and use it in step 4 to create a master ticket record in master ticket table 112p to define the network ticket. Accordingly, a master ticket can be defined by a unique master ticket ID and can be associated with a network object (e.g., by including the network object ID in the master ticket record). A master ticket can also define the information that will be common to child support tickets (e.g., the subject, help topic and network issue).

Figure 6D:
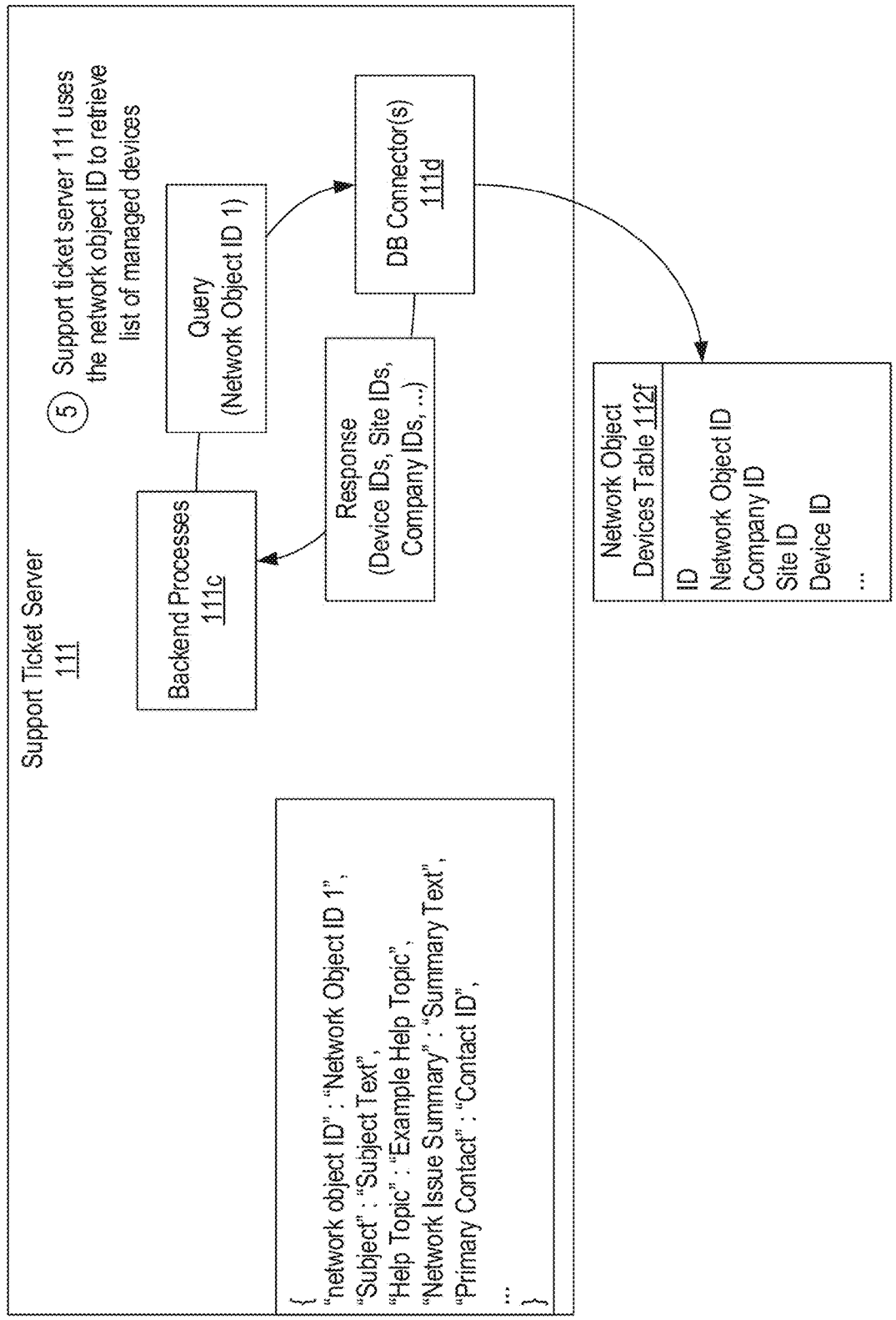
Figure 6E:
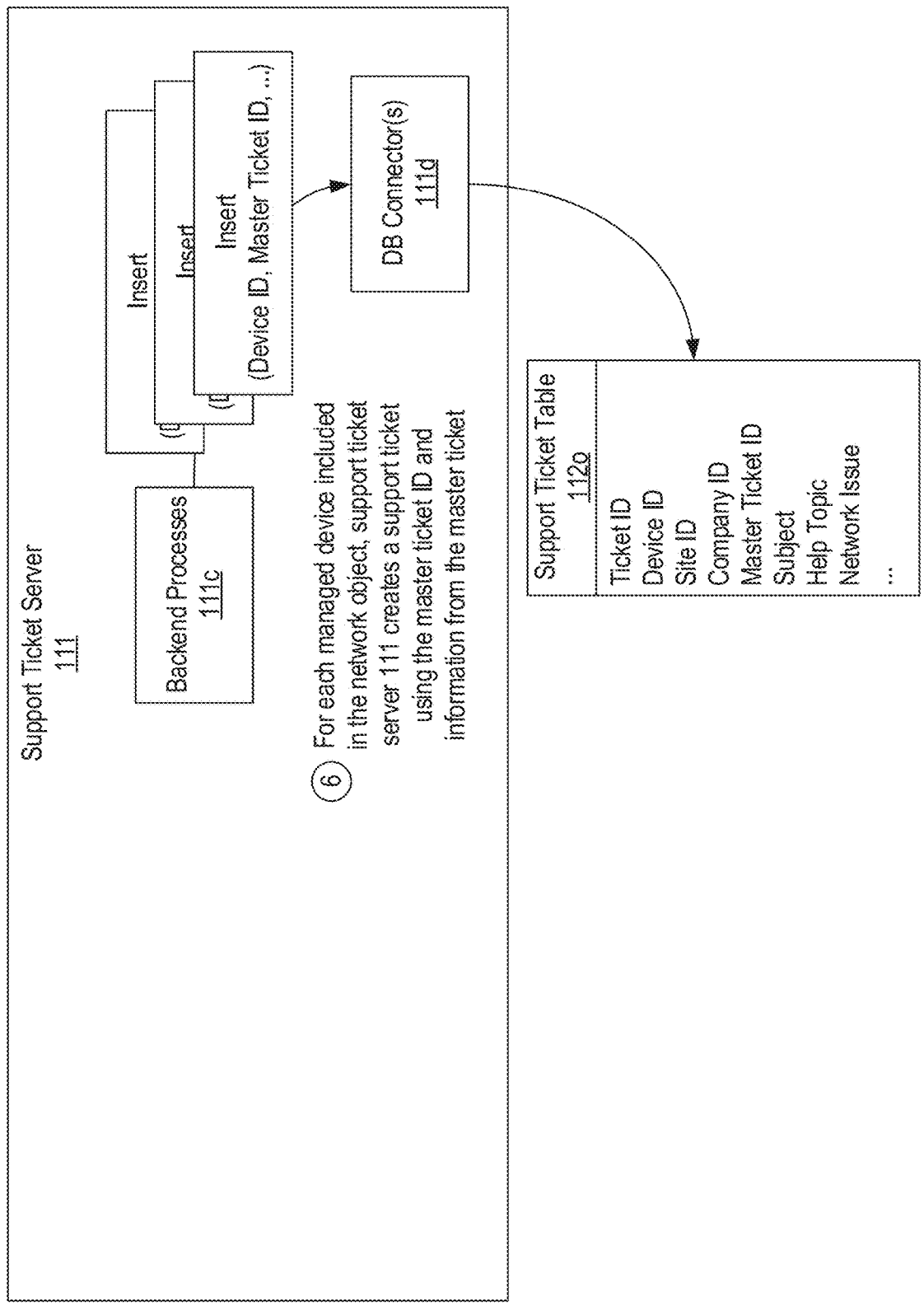

Turning to FIG. 6D, in step 5, which is not necessarily performed after step 4, backend processes 111c can use the network object ID to retrieve a list of the managed devices that are included under the network object. For example, backend processes 111c could retrieve the device ID from each record from network object table 112f that includes Network Object ID 1 along with other information such as the site ID and company ID. Finally, in step 6, backend processes 111c can create a support ticket for each of the managed devices that are included under the network object. For example, backend processes 111c could create a record in support ticket table 112o using each device ID and corresponding site and company IDs, the master ticket ID and the other information that was provided in network ticket creation request 601. Notably, each of these support tickets can be logically associated via the master ticket ID.

In cases where a network object may include managed devices for more than one company, a similar process could be followed except that support ticket server 111 could create a master ticket for each company. With reference to FIG. 6c, this could be accomplished by first identifying which companies were associated with the specified network object and then creating a record in master ticket table 112p for each company. In such cases, a record in master ticket table 112p could identify the company to which the record pertains (e.g., by including a Company ID field). Then, when a support ticket record is created using the network object, backend processes 111c could determine to which company the corresponding manage device pertains and then associate the support ticket record with the master ticket ID for that company's master ticket. In short, when support tickets are created from a network object, one or more company-specific master tickets can be created along with managed-device-specific support tickets that are arranged hierarchically below the corresponding company-specific master ticket.

To summarize, by using a network object, support personnel need only to provide the information about the network issue (e.g., subject, help topic, network issue summary, primary contact, etc.) and identify an appropriate network object. Support ticket platform 110 will then use the network object to automatically create a hierarchical arrangement of one or more master tickets and support tickets thereby allowing a large number of supports tickets to be created very quickly. This hierarchical arrangement also simplifies management of the support tickets as described below.

A similar process can be performed to create a company object and then use the company object to create a number of support tickets. As with network objects, a company object can be created by providing a company object name and identifying each managed device to be included under the company object. Unlike a network object, a company object only includes managed devices that pertain to a single company. However, these managed devices may be spread across multiple sites. When a company object is used to create support tickets, a company-specific master ticket can be created in the manner described above with each support ticket being arranged hierarchically below the master ticket. In particular, each support ticket can be populated with the same common information regarding the network issue and identify the same master ticket ID but can be associated with a particular managed device.

In addition to simplifying the creation of large numbers of support tickets, the use of network and company objects simplifies the management and closing of support tickets. For example, as part of creating support tickets using a network object or company object, support personnel may select an option to automatically close the support tickets at a particular time or in response to a particular action. In such cases, an auto close indication could be associated with each support ticket that is created such as by including an auto close date in each master ticket record. Backend processes 111c could be configured to monitor for master ticket records having an auto close date that has been reached and, when one is detected, proceed to close any support tickets that are associated with the master ticket record (e.g., closing any support ticket that includes the master ticket ID). Similarly, if an auto close is triggered by some event (e.g., a response sent by support personnel to a company indicating that a network issue has been resolved), backend processes 111c can employ the master ticket ID to locate and close all associated support tickets.

This auto close functionality could also be implemented at the individual support ticket level. For example, when support personnel believe they have resolved a network issue, they can select an auto close option (e.g., via the dashboard while viewing a particular support ticket). In response, backend processes 111c could update the corresponding support ticket record in support ticket table 112o to indicate that the support ticket should be automatically closed (e.g., by setting an auto close date field in the record). In some embodiments, backend processes 111c could be configured to set the support ticket to automatically close after a particular amount of time (e.g., 24 hours). Backend processes 111c could then be configured to periodically scan support ticket records to identify those that should be closed. By setting support tickets to close after a particular amount of time, support ticket platform 110 can free the support personnel from having to manually close support tickets while providing a window for ensuring that the network issue has been fully resolved.

In some embodiments, support ticket server 111 may provide an interactive ticket map to facilitate visualizing open support tickets which in turn facilitates locating network issues. An interactive ticket map could be provided to support personnel and/or end users. With reference to FIG. 3B, support ticket records in support ticket table 112o can include a site ID which identifies the site of the managed device to which the support ticket corresponds. To populate the interactive ticket map, backend processes 111c can be configured to first query support ticket table 112o to retrieve the appropriate support tickets records (e.g., all support ticket records for a particular company). Additionally, backend processes 111c could employ the site ID in each support ticket record to locate the corresponding site record from site table 112b and to extract the latitude and longitude values from the site record. Backend processes 111c could then use the latitude and longitude values to display a graphical representation of the support ticket in the proper location on the interactive ticket map. In this way, a company administrator, support personnel or other user could quickly identify where network issues exist.

The interactive ticket map can also enable a user to manipulate the map (e.g., to zoom in or out) and to select a graphical representation of a support ticket to view details of the support ticket. In some embodiments, backend processes 111c may also generate a list view of the support tickets and display it with the interactive ticket map so that a user can view a graphical representation of the support ticket and the textual details of the support ticket at the same time.

As support ticket server 111 implements the above-described functionality and other functionality, records can be created in application log table 112i and system log table 112j with granular detail that enables troubleshooting issues within support ticket platform 110. For example, backend processes 111c can be configured to create records in application log table 112i which represent support-ticket-specific events using a log ID, a log type (e.g., success, info, error, DB error, validation error, etc.) which defines a type of the event, a code which defines the event, a title, text, and a support ticket ID among possibly other values. Similarly, backend processes 111c can be configured to create records in system log table 112j which represent internal system events using a log ID, a log type (e.g., debug, warning, error, etc.), a title, text and an identification of the component that generated the system event among possibly other values. By defining a log type for each record in application log table 112i and system log table 112j, support personnel can quickly identify, sort and/or filter specific types of log events to more quickly identify and address issues that may occur within support ticket platform 110.

In some embodiments, company records and/or site records can include a field that identifies when a hold has been placed on a company and/or site. For example, site table 112b and company table 112c are shown as including an Is_hold field which when set can indicate to backend processes 111c that any support ticket functionality for the particular company or site should not be implemented until the hold is removed. For example, if an end user at a particular company submits a request to create a support ticket or attempts to access the interactive ticket map, backend process 111c could first verify whether the Is_hold field is set in the corresponding company record and/or site record(s) and then allow the access only when the field is not set. This hold feature can function as a way to quickly notify a company or site that an issue needs to be resolved.

In some embodiments, support ticket server 111 and/or support ticket database 112 can be configured to allow only a single support ticket to be opened for a particular managed device at any given time. This single ticket policy can prevent the creation of duplicate support tickets that may otherwise occur frequently as alerts for the same network issue are sent. However, the single ticket policy can create problems in certain scenarios. For example, if support ticket is opened for a managed device and represents a minor network issue, support personnel may not provide priority to the network issue. Yet, if the same managed device experienced a major network issue (e.g., a high bandwidth event), the single ticket policy would prevent another support ticket from being created even though support ticket server 111 would receive an alert of this major network issue.

To address such scenarios, support ticket server 111 can be configured to employ policy violations to dictate if and when multiple support tickets can be opened for the same managed device. For example, policy table 112k can define policy violation records each of which identifies a managed device that is exempted from the single ticket policy as well as a time period for the exemption. When backend processes 111c handle an alert and determine that a support ticket already exists for a managed device to which the alert pertains, backend processes 111c can query policy table 112k to determine whether the managed device is current exempt from the single ticket policy. If so, backend processes 111c can proceed to create a support ticket from the alert even though it will result in multiple support tickets being concurrently open for the same managed device. In some embodiments, a support ticket that is created based on a policy violation can be flagged so that support personnel can detect the policy violation.

Figure 7B:
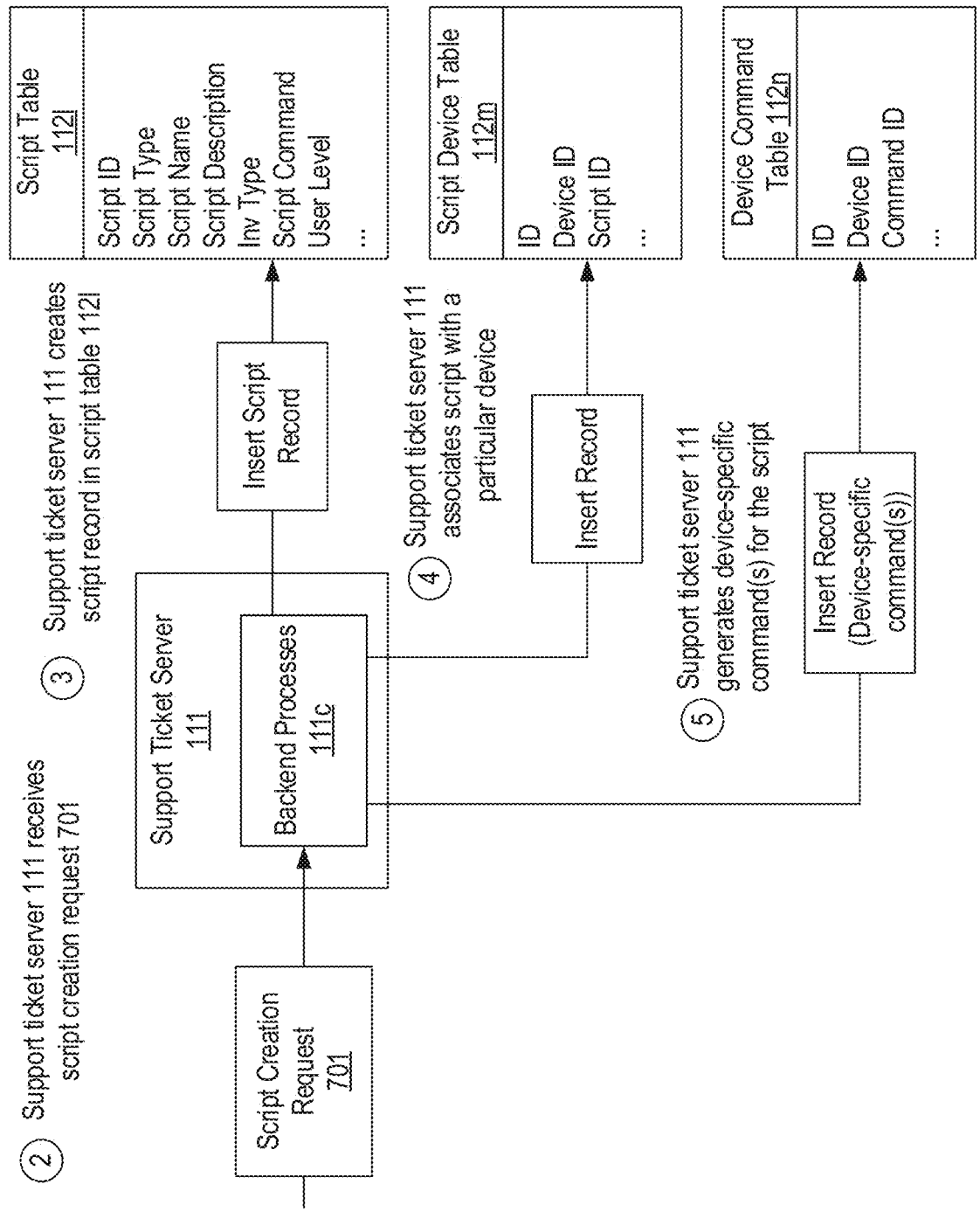

To facilitate automated testing and to enable self-healing of a network infrastructure 200, support ticket platform 110 can employ scripting. FIGS. 7A-7D provide an example of how scripting can be implemented. FIG. 7A illustrates how support personnel can create a script for use within support ticket platform 110. When creating a script, the support personnel can specify a script type (e.g., diagnostic, configuration, reporting, etc.), a script name, a script description and the actual script command(s) to be executed. In some embodiments, the support personnel may also define whether a script may be used by administrators or technicians.

Turning to FIG. 7B, for simplicity, a script creation request 701 is shown as being received by backend processes 11c in step 2. In response, in step 3, backend processes 111c can create a script record in script table 112l. Notably, the script command that is defined in the script record in script table 112l can be a general command (i.e., not device specific). For example, the script command may include a placeholder for an IP address or other device-specific information. By defining the script command as a general command, it can be executed against many managed devices.

In step 4, backend processes 111c can also create a record in script device table 112m that maps the particular script to a particular managed device. Backend processes 111c could perform this step for each managed device to which the script pertains (e.g., based on the value of the Inv Type field in the script record). Script device table 112m can be used to quickly identify all scripts that pertain to a particular device. For example, when support personnel are working on a particular device (e.g., by accessing a user interface provided by support ticket server 111), they may desire to see which scripts can be used with the particular device. In such cases, backend processes 111c can submit a query to retrieve all records from script device table 112m for the particular device and then use the script IDs in these records to retrieve the details of each script from script table 112l.

In step 5, backend processes 111c can also create a record in device command table 111n that defines the device-specific script command(s). For example, if the script creating in step 3 has a script command with a placeholder for the IP address, the device-specific script command that is included in the record created in step 5 can include the managed device's IP address (which could have been retrieved from the device record in managed device table 112a) in place of the placeholder so that the device-specific script command is ready to be executed.

Figure 8:
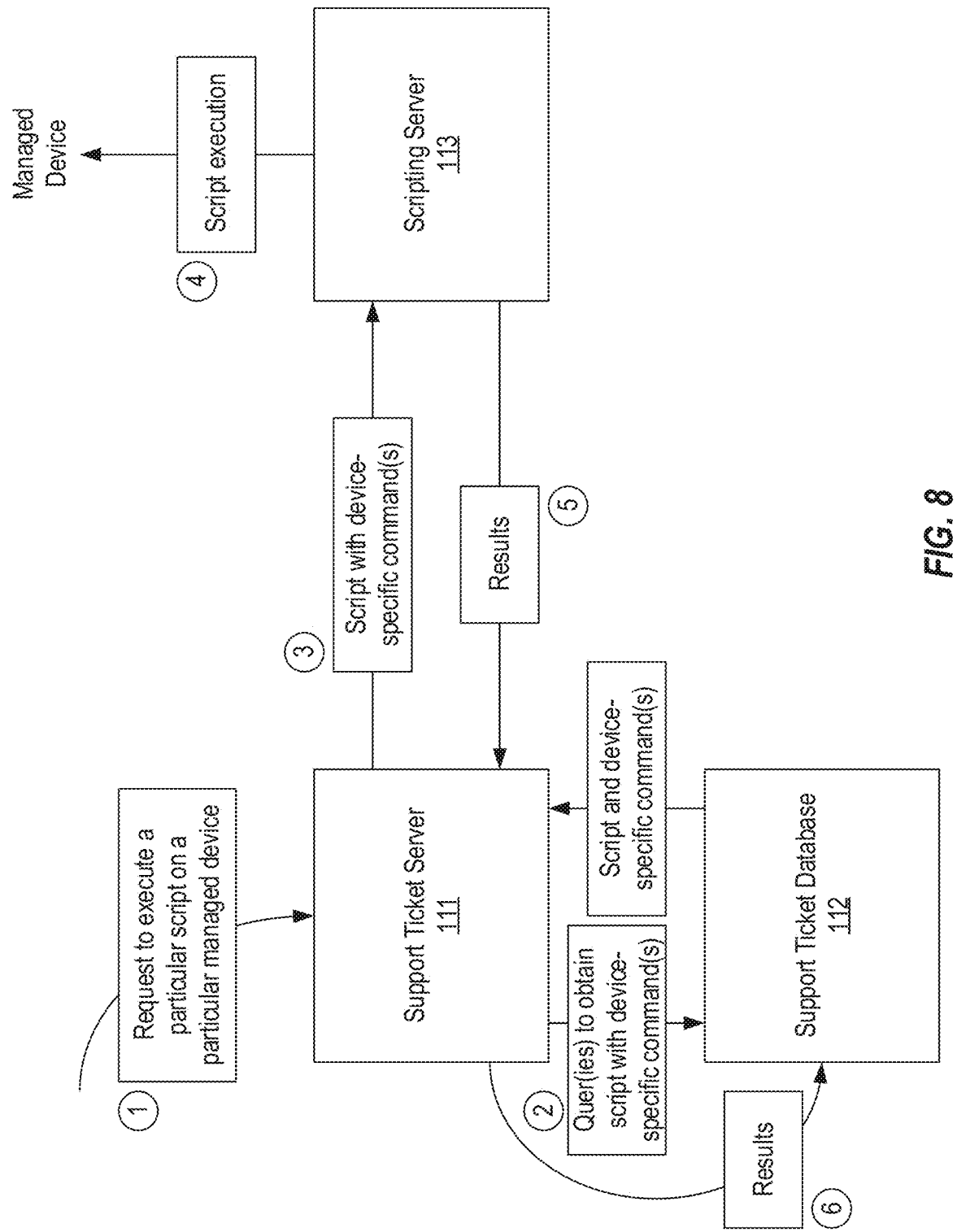

Accordingly, after backend processes 11c have caused these records to be created, authorized support personnel will be able to execute the script on any managed device to which the script pertains. FIG. 8 represents how support ticket platform 110 can leverage this scripting configuration to simplify the management of network infrastructures 120. As shown, in step 1, support personnel can submit a request to execute a particular script on a particular managed device. For example, as mentioned above, when support personnel are working on a particular managed device, support ticket server 111 can employ script device table 112m and script table 112l to identify each script that pertains to the particular managed device and then present a listing of these scripts to allow the support personnel to select one or more to be executed.

In step 2, support ticket server 111 can respond to the request by submitting one or more queries to obtain/build the script with command(s) that are specific to the particular managed device. For example, backend processes 111c could query script table 111l to obtain the general script command, query device command table 112n to obtain the device-specific commands and then generate the script with the device-specific command(s). Notably, because each script is defined with a general script command, there is no need to define a script that is specific to each managed device. In contrast, only the portions of the script command that need to be customized for a particular managed device (e.g., an IP address) are defined on a per-device basis. This reduces the overhead of creating and maintaining scripts.

Once the script with the device-specific command(s) has been obtained/built, in step 3, support ticket server 111 can send the script with the device-specific command(s) to scripting server 113 which will execute the script in step 4 (e.g., by running the device-specific command(s) via SSH). This offloading of the script execution to the separate scripting server 113 ensures that the execution of scripts will not jeopardize the performance of support ticket server 111.

The execution of the script will produce results that scripting server 113 can report to support ticket server 111 in step 5. Finally, in step 6, support ticket server 111 can generate one or more queries for attaching these results to a support ticket that is opened for the particular managed device. For example, although not shown, records in support ticket table 112o could include a field for storing script results so that the script results will be accessible to any support personnel that may review the support ticket.

In some embodiments, support ticket server 111 can be configured to perform the process represented in FIG. 8 automatically in response to an alert. For example, backend processes 111c can be configured to detect when particular types of alerts are received and, in response, trigger the execution of a particular script to attempt to automatically correct the network issue. The script itself could be configured to modify the managed device to correct the network issue. Alternatively or additionally, support ticket server 111 could employ the results of the script to identify and perform actions (e.g., executing another script) on the managed device to correct the network issue. In this way, support ticket platform 110 can cause a network infrastructure 120 to self-heal.

Figure 9:
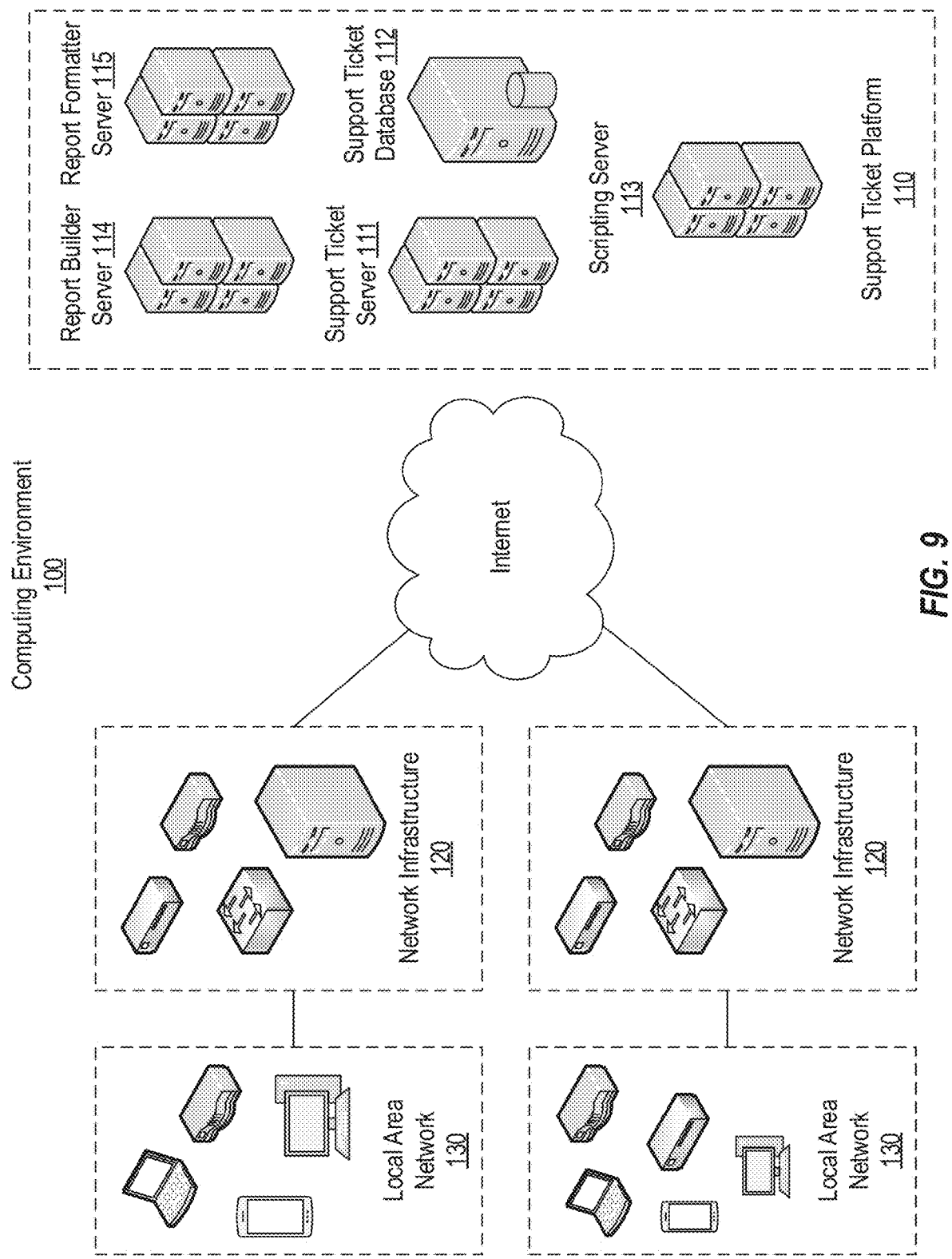
FIG. 9 illustrates an embodiment of a support ticket platform that provides enhanced reporting functionality.

FIG. 9 illustrates that, in some embodiments, support ticket platform 110 may include a report builder server 114 and a report formatter server 115 that can be used to automate the process of creating reports and providing them to a company's end users. Each of these depicted servers can represent one or more physical and/or virtual machines on which components that perform the functionality described herein are executed.

Report builder server 114 can be configured to build report objects that can be in a text-based format such as JSON. Each report object can be specific to a managed device and can define what information should be included in the report. Once a report object has been created, report builder server 114 can provide the report object to support ticket server 111 which can then store the report object in support ticket database 112 (e.g., in a report table that links the report object to a particular managed device, company, site, etc.). Report builder server 114 can be configured to update the content of a report object at periodic intervals (e.g., every 24 hours), on demand (e.g., when a support ticket is created for the managed device) or at any other time.

Report formatter server 115 can be configured to create formatted reports from the report objects. For example, support ticket server 111 can be configured to send a report object to report formatter server 115 at periodic intervals, on demand or at any other time to cause report formatter server 115 to create a PDF report from the content of the report object, report formatter server 115 can then send the formatted report to support ticket server 111 which in turn can store the formatted report as an attachment to a support ticket that is opened for the corresponding managed device.

By periodically creating/updating reports in this manner, a formatted report will be available immediately when a company's end user requests one. Similarly, when a support ticket is opened for a particular managed device, there will likely be an up-to-date report that already exists for the particular managed device. In such cases, support ticket server 111 can immediately obtain the existing report and attach it to the support ticket that has just been opened. In contrast, if an up-to-date does not exist for the particular managed device, support ticket server 111 could immediately request that one be created and then attach it to the support ticket. This automatic creation and use of reports not only reduces the overhead on support staff but increases the efficiency of correcting network issues in a network infrastructure 120.

In summary, the architecture and configuration of support ticket platform 110 provides a number of improvements to a network infrastructure 120. With support ticket platform 110, a large number of network infrastructures 120 can be implemented and maintained. Support ticket platform 110 also enables network issues to be automatically detected and possibly corrected. In cases where support personnel need to address a network issue, support ticket platform 110 simplifies the process and provides mechanisms to quickly and efficiently correct the network issue so that the network infrastructure 120 can continue its proper operation.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. Computer storage media storing computer executable instructions which when executed implement a support ticket platform for managing a plurality of network infrastructures, the support ticket platform comprising:
 a support ticket database that defines network objects; and
 a support ticket server that is in communication with the support ticket database and that is configured to receive alerts from the plurality of network infrastructures, wherein in response to receiving an alert that defines a network issue, the support ticket server automatically creates a support ticket to represent the network issue by performing the following:
  parsing the alert to obtain a service ID that is included in the alert, the service ID uniquely identifying a particular managed device that is the cause of the network issue within the support ticket platform;
  employing the service ID that was parsed from the alert to query the support ticket database to retrieve information about the particular managed device including an identifier of the managed device, an identifier of a site where the managed device is located and an identifier of a company that is associated with the site; and
  employing the information about the particular managed device that was retrieved using the service ID that was parsed from the alert, including the identifier of the managed device, the identifier of the site where the managed device is located and the identifier of the company that is associated with the site, to submit one or more requests to the support ticket database to create a support ticket that associates the network issue with the particular managed device;
 wherein the support ticket server is further configured to receive requests to create support tickets from network objects, wherein in response to receiving a request to create support tickets from a particular network object, the support ticket server creates a plurality of support tickets using the particular network object by performing the following:
employing the identifier of the particular network object to query the support ticket database to retrieve identifiers of a plurality of managed devices that are associated with the particular company object;
detecting that the plurality of managed devices that are associated with the particular network object are associated with different companies;
employing an identifier of the particular network object to submit one or more requests to the support ticket database to create a master ticket for each of the different companies, each master ticket representing a network issue; and
for each of the plurality of managed devices, employing the identifier of the managed device to create a support ticket that is associated with the master ticket for the company with which the corresponding managed service is associated and which also represents the network issue that the master ticket represents.

2. The computer storage media of claim 1, wherein the alert is an email.

3. The computer storage media of claim 1, wherein the service ID functions as a unique identifier of the particular managed device within the support ticket platform.

4. The computer storage media of claim 1, wherein the support ticket server is further configured to employ the association between each master ticket and the support tickets to close each of the support tickets when the network issue that each master ticket represents is resolved.

5. The computer storage media of claim 1, wherein the support ticket database defines company objects and the support ticket server is further configured to receive requests to create support tickets from company objects, wherein in response to receiving a request to create support tickets from a particular company object, the support ticket server creates a plurality of support tickets using the particular company object by performing the following:
employing an identifier of the particular company object to submit one or more requests to the support ticket database to create a master ticket representing a network issue;
employing the identifier of the particular company object to query the support ticket database to retrieve identifiers of a plurality of managed devices that are associated with the particular company object; and
for each of the plurality of managed devices, employing the identifier of the managed device to create a support ticket that is associated with the master ticket and which also represents the network issue that the master ticket represents.

6. The computer storage media of claim 5, wherein the support ticket server is further configured to employ the association between the master ticket and the support tickets to close each of the support tickets when the network issue that the master ticket represents is resolved.

7. The computer storage media of claim 1, wherein the support ticket server is configured to automatically close a support ticket by performing the following:
receiving input that identifies that a network issue represented by the support ticket has been resolved;
in response to the input, submitting one or more requests to the support ticket database to add an auto close time to the support ticket; and
in response to subsequently detecting that the auto close time has been reached, closing the support ticket.

8. The computer storage media of claim 1, wherein the support ticket server is configured to provide an interactive ticket map by performing the following:
querying the support ticket database to identify all support tickets that match specified criteria;
for each identified support ticket, querying the support ticket database to retrieve coordinates that are associated with the support ticket; and
for each identified support ticket, employing the coordinates to display a graphical representation of the support ticket in a corresponding location on the interactive ticket map.

9. The computer storage media of claim 1, wherein the support ticket server is configured to provide the interactive ticket map by also performing the following:
displaying a list of the identified support tickets alongside the interactive ticket map, the list providing details of each of the identified support tickets.

10. The computer storage media of claim 1, wherein the support ticket server automatically creates the support ticket to represent the network issue by also performing the following:
prior to submitting the one or more requests to create the support ticket, determining that another support ticket is already open for the particular managed device;
querying the support ticket database to determine that a policy violation has been defined for the particular managed device or for the network issue that is defined in the alert; and
based on the determination, submitting the one or more requests to the support ticket database to create the support ticket that associates the network issue with the particular managed device even though the other support ticket is already open.

11. The computer storage media of claim 1, wherein the support ticket server is configured to:
receive a request from a company to access functionality of the support ticket platform;
in response to the request, query the support ticket database to determine that a hold has been defined for the company; and
in response to determining that the hold has been defined for the company, blocking the company's request to access the functionality of the support ticket platform.

12. The computer storage media of claim 1, wherein the support ticket platform also includes a scripting server, and wherein the support ticket database defines scripts and the support ticket server is further configured to receive requests to execute scripts on managed devices, wherein in response to receiving a request to execute a particular script on a particular managed device, the support ticket server causes a version of the particular script that is specific to the particular managed device to be executed by performing the following:
querying the support ticket database to retrieve a version of the particular script that is not specific to the particular managed device;
querying the support ticket database to retrieve one or more commands that are specific to the particular managed device;
adding the one or more commands to the version of the particular script that is not specific to the particular managed device to create the version of the particular script that is specific to the particular managed device; and causing the version of the particular script that is specific to the particular managed device to be executed by the scripting server.

13. The computer storage media of claim 12, wherein the support ticket server causes the version of the particular script that is specific to the particular managed device to be executed by also performing the following:
   receiving results of executing the version of the particular script that is specific to the particular managed device; and
   submitting one or more requests to the support ticket database to store the results in association with a support ticket that is open for the particular managed device.

14. The computer storage media of claim 1, wherein the support ticket platform also includes a report builder server and a report formatter server, and wherein the support ticket server creates and manages reports pertaining to managed devices by performing the following:
   receiving, from the report builder server, report objects;
   submitting requests to the support ticket database to cause the report objects to be stored in the support ticket database;
   periodically sending the report objects to the report formatter server to cause the report formatter server to generate and return corresponding formatted reports; and
   submitting requests to the support ticket database to cause each of the formatted reports to be stored in association with a support ticket that is open for the managed device to which the formatted report pertains.

15. A method, implemented by a support ticket platform that includes a support ticket server and a support ticket database, for managing a plurality of network infrastructures, the method comprising:
   receiving, by the support ticket server, a request to create support tickets using a network object or a company object, the network object representing a group of managed devices, the company object representing managed devices that pertain to a single company;
   employing an identifier of the network object or the company object to submit one or more requests to the support ticket database to create a master ticket representing a network issue;
   employing the identifier of the network object or the company object to query the support ticket database to retrieve identifiers of a plurality of managed devices that are associated with the network object or the company object;
   for each of the plurality of managed devices, employing the identifier of the managed device to create a support ticket that is associated with the master ticket and which also represents the network issue that the master ticket represents;
   storing an auto close indication in association with the master ticket;
   in response to detecting that a condition of the auto close indication has been met, identifying each support ticket that is associated with the master ticket; and
   automatically closing each support ticket that is associated with the master ticket.

16. The method of claim 15, further comprising:
   in response to receiving an alert that defines a network issue, parsing the alert to obtain a service ID that is included in the alert;
   employing the service ID to query the support ticket database to retrieve information about a particular managed device; and
   employing the retrieved information about the particular managed device to submit one or more requests to the support ticket database to create a support ticket that associates the network issue with the particular managed device.

17. A method, implemented by a support ticket platform that includes a support ticket server and a support ticket database, for managing a plurality of network infrastructures, the method comprising:
   employing the support ticket database to associate managed devices with service IDs, each service ID uniquely identifying a particular managed device within the support ticket platform;
   in response to receiving alerts that include service IDs, employing the service IDs parsed from the alerts to retrieve information about the associated managed devices from the support ticket database, including, for each managed device, an identifier of the managed device, an identifier of a site where the managed device is located and an identifier of a company that is associated with the site, and employing the retrieved information to automatically create support tickets;
   employing the support ticket database to associate network or company objects with managed devices;
   in response to receiving requests to create support tickets using network or company objects, employing the network or company objects to create one or more master tickets and support tickets for the associated managed devices and to arrange the support tickets hierarchically below the one or more master tickets;
   storing an auto close indication in association with a first master ticket of the one or more master tickets;
   in response to detecting that a condition of the auto close indication has been met, identifying each support ticket that is associated with the master ticket; and
   automatically closing each support ticket that is associated with the master ticket.

* * * * *